No. 748,058. PATENTED DEC. 29, 1903.
E. D. EASTMAN.
SPRINKLING WAGON.
APPLICATION FILED NOV. 4, 1903.
NO MODEL. 2 SHEETS—SHEET 1.

WITNESSES.
A. N. B. Emery.
A. K. Hood.

INVENTOR.
Edgar D. Eastman.
By his Att'y.

No. 748,058. PATENTED DEC. 29, 1903.
E. D. EASTMAN.
SPRINKLING WAGON.
APPLICATION FILED NOV. 4, 1903.
NO MODEL. 2 SHEETS—SHEET 2.

WITNESSES.
A. W. B. Emery.
A. K. Hood.

INVENTOR
Edgar D. Eastman
By his Atty
Henry W. Williams

No. 748,058. Patented December 29, 1903.

UNITED STATES PATENT OFFICE.

EDGAR D. EASTMAN, OF CONCORD, NEW HAMPSHIRE.

SPRINKLING-WAGON.

SPECIFICATION forming part of Letters Patent No. 748,058, dated December 29, 1903.

Application filed November 4, 1903. Serial No. 179,803. (No model.)

*To all whom it may concern:*

Be it known that I, EDGAR D. EASTMAN, a citizen of the United States, residing in Concord, in the county of Merrimack and State of New Hampshire, have invented new and useful Improvements in Sprinkling-Wagons, of which the following is a specification.

My invention has for its principal object to provide a pair of sills which will not rot by the action of the water splashing over and upon them and working under them and which will provide for the reception and protection of the valve-rods which connect the mechanism operating the valves in the sprinkler-heads with the mechanism directly operated by the driver.

The nature of the invention is fully described in detail below and illustrated in the accompanying drawings, in which—

Figure 1:
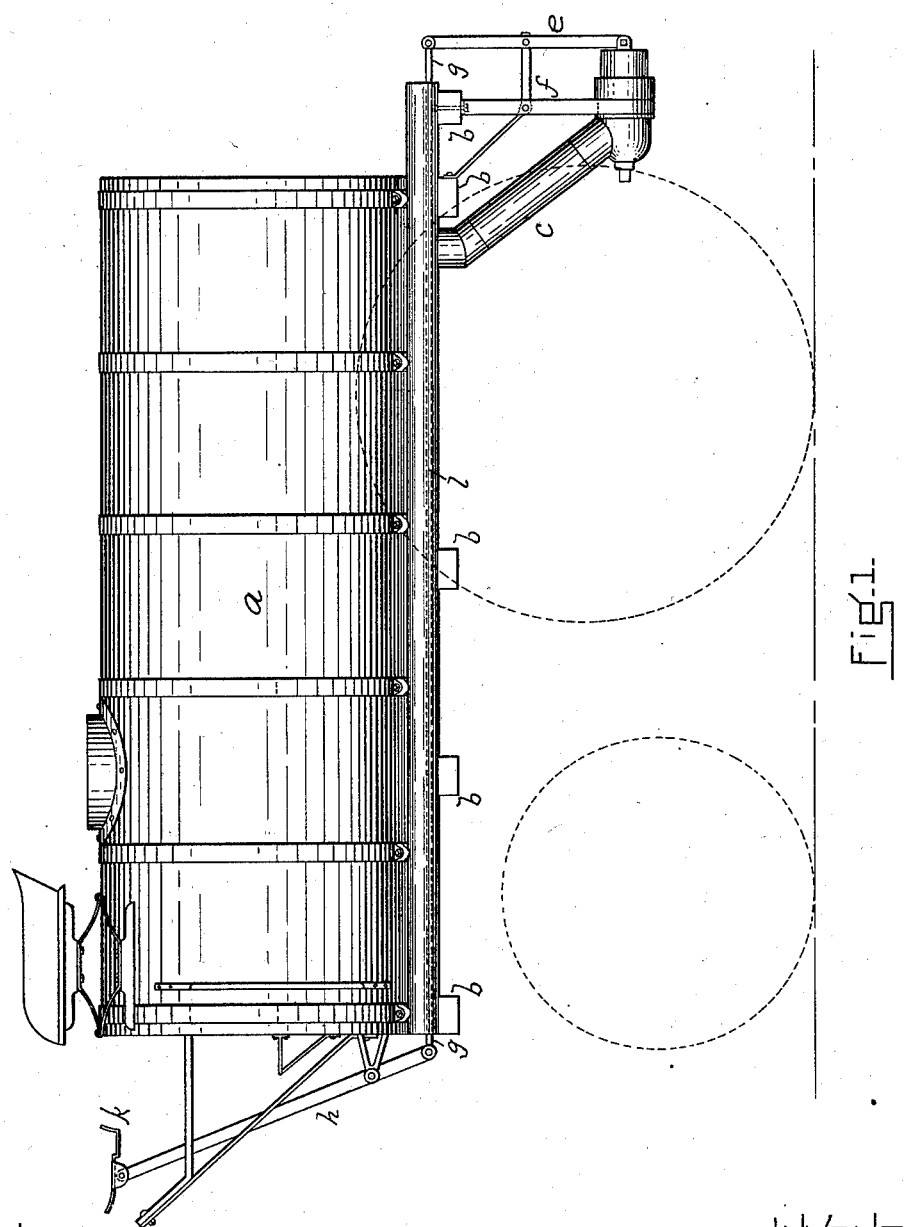
Figure 2:
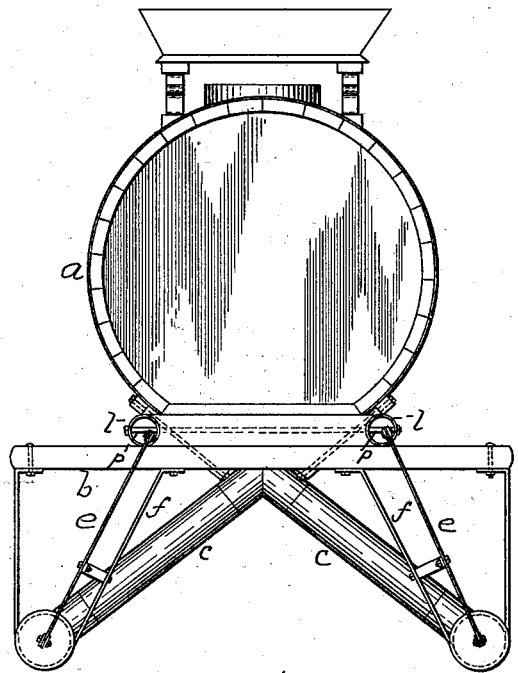
Figure 3:
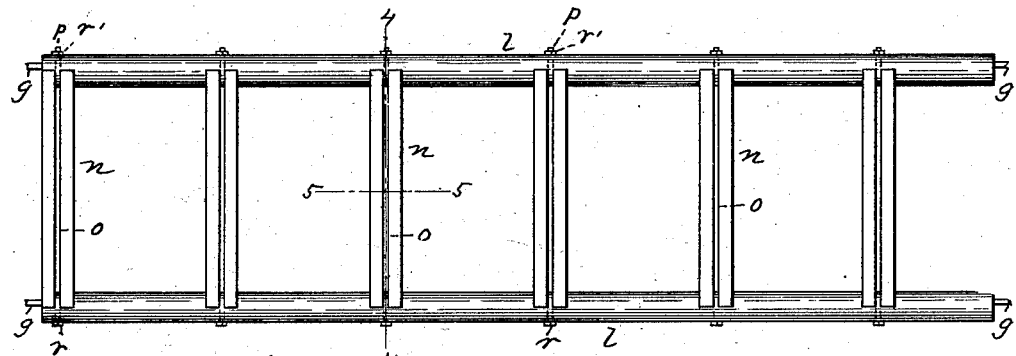
Figure 4:
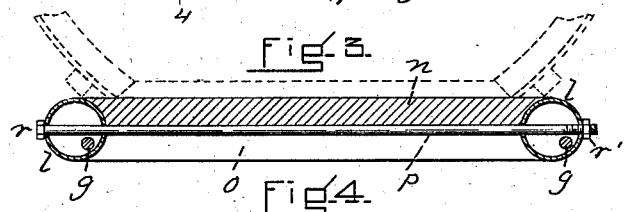
Figure 5:
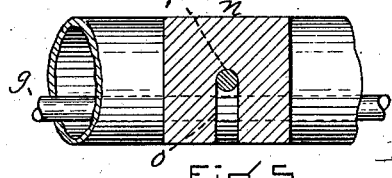

Figure 1 is a side elevation of the principal portion of a sprinkler embodying my invention, the running-gear being omitted and the position of the wheels being indicated by dotted lines. Fig. 2 is a rear elevation of the same. Fig. 3 is a plan of the under side of the sills removed and the cross-sills connecting the same. Fig. 4 is an enlarged section taken through line 4, Fig. 3. Fig. 5 is an enlarged section taken through line 5, Fig. 3. The sectional views shown in Figs. 4 and 5 illustrate the sills and cross-sill right side up.

Similar letters of reference indicate corresponding parts.

*a* represents the tank, and *b* cross-pieces making portions of the frame.

*c c* represent tubes or pipes leading to the heads *d d*, containing suitable valves which are connected to levers *e*, supported by frames *f*, said levers being each connected by a valve-rod *g* with a lever *h*, which is provided at its upper end with a pedal *k*, adapted to be operated by the driver. None of these parts are new in themselves considered nor in their arrangement to one another. Of course it will be understood that there are two valve-rods *g*, one on each side of the tank.

*l l* represent tubular metallic sills located on opposite sides of the lower portion of the tank as far under said tank as practicable, said sills being set longitudinally with the tank and being intended to take the place of the ordinary wooden sills, which by reason of the splashing of water over and upon them and working under them when the tank is being filled and when the sprinkler is moving over rough pavements very soon become rotten. These sills extend from the front end of the tank to a point somewhat beyond the rear end thereof, and the valve-rods *g*, which are when wooden sills are employed located outside thereof, extend through the tubular sills *b* and are thereby protected from injury of every kind which is liable to occur in a device of this character.

The sills in practical arrangement are connected by cross-sills *n*, as illustrated in Figs. 3, 4, and 5. These cross-sills are preferably made of wood, whose opposite ends are curved to fit against and partly around the sills *l*, and the under side of each cross-sill is provided with a longitudinal groove *o*, whereby a bolt *p* is applied to the cross-sill, said bolt extending centrally through the opposite sills *l* and bolting them against the cross-sills *n* by means of a head and nut *r r'*. In arranging the parts it will be seen by reference particularly to Figs. 3 and 4 that while the bolts *p* extend transversely and centrally through the sills the valve-rods *g* extend through the sills at points below the center, and hence below said bolts. Thus the bolts and valve-rods do not interfere, and the sills are held snugly under the tank and as nearly as possible toward the center of the under side thereof. As these tubular sills are metallic and as they can be made sufficiently small to extend well in under the tank, they are not affected by the action of water, and as the valve-rods are within said sills they are protected from water, blows, or accident of any ordinary kind.

Having thus fully described my invention, what I claim, and desire to secure by Letters Patent, is—

1. In a sprinkler of the character described, the combination with the tank, of tubular metallic sills located on opposite sides of and parallel with said tank, and valve-rods extending through and contained in said tubular sills, said valve-rods connecting the mechanism for directly actuating the valves and the mechanism directly operated by the driver, for the purpose set forth.

2. In a sprinkler of the character described, the pair of tubular sills $l$; the cross-sills $n$ provided on their under sides with the longitudinal grooves $o$; the bolts or cross-rods $p$ extending through said slots and connecting the sills; and the valve-rods $q$ extending through and contained in said tubular sills, and connecting the mechanism for directly actuating the valves and the mechanism directly operated by the driver, substantially as and for the purpose set forth.

In testimony whereof I have signed my name to this specification in the presence of two subscribing witnesses.

EDGAR D. EASTMAN.

Witnesses:
 LUCY M. MASON,
 J. BLANCHE NEWHALL.